United States Patent
Liou et al.

(10) Patent No.: US 9,294,406 B2
(45) Date of Patent: Mar. 22, 2016

(54) USE OF SWITCHING FOR OPTIMIZING TRANSPORT COSTS FOR BANDWIDTH SERVICES

(71) Applicant: Infinera Corp., Annapolis Junction, MD (US)

(72) Inventors: Christopher C. Liou, Cupertino, CA (US); Ping Pan, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 196 days.

(21) Appl. No.: 13/950,094

(22) Filed: Jul. 24, 2013

(65) Prior Publication Data

US 2015/0029846 A1    Jan. 29, 2015

(51) Int. Cl.
*H04L 12/26* (2006.01)
*H04L 12/803* (2013.01)
*H04L 12/851* (2013.01)

(52) U.S. Cl.
CPC .......... *H04L 47/122* (2013.01); *H04L 47/2441* (2013.01)

(58) Field of Classification Search
USPC ............. 370/229, 230, 236, 252, 351, 395.2, 370/395.21, 465, 466, 469
See application file for complete search history.

(56) References Cited

U.S. PATENT DOCUMENTS

| | | | | |
|---|---|---|---|---|
| 6,484,210 | B1 * | 11/2002 | Adriano et al. ............... | 709/239 |
| 7,447,728 | B1 * | 11/2008 | Arunkumar et al. .......... | 709/200 |
| 7,600,039 | B2 * | 10/2009 | Tang et al. .................... | 709/238 |
| 8,265,014 | B2 * | 9/2012 | Reumerman et al. ......... | 370/329 |
| 2002/0091810 | A1 * | 7/2002 | Hundscheidt et al. ........ | 709/223 |
| 2008/0019274 | A1 * | 1/2008 | Droux et al. .................. | 370/235 |
| 2011/0188390 | A1 * | 8/2011 | Kwag et al. ................... | 370/252 |
| 2013/0114482 | A1 * | 5/2013 | Oh et al. ....................... | 370/310 |
| 2014/0149569 | A1 * | 5/2014 | Wittenstein et al. .......... | 709/224 |

* cited by examiner

*Primary Examiner* — Kwang B Yao
*Assistant Examiner* — Nguyen Ngo
(74) *Attorney, Agent, or Firm* — Dunlap Codding PC; David Soltz

(57) ABSTRACT

Methods and systems are disclosed for receiving, with circuitry of a network controller, information indicative of characteristics of incoming data traffic in an information transport network, the network comprising at least one packet switched layer and at least one transport layer; determining to transport the incoming data traffic through at least one determined layer being at least one of the packet switched layer and the transport layer, based on the characteristics of the incoming data traffic and/or network information; determining at least one route for the incoming data traffic through the determined layer; and transmitting a signal containing computer executable instructions to at least one switch, to configure the switch to steer the incoming data traffic through the at least one route of the at least one determined layer. The information indicative of characteristics of data traffic may be gathered/provided by one or more traffic monitor.

18 Claims, 13 Drawing Sheets

USE OF SWITCHING FOR OPTIMIZING TRANSPORT COSTS FOR BANDWIDTH SERVICES

FIELD OF THE DISCLOSURE

The disclosure generally relates to methods and apparatuses for traffic control in information transport networks. More particularly the disclosure relates to methodologies for more efficient data transport switching in networks having packet switched and transport layers, through manipulation of data traffic across transport and/or packet switched layers. Though the methodologies set forth herein are in the context of traffic engineering (TE) routing in optical information transport networks, such methodologies may be applied to any transport network that utilizes traffic switching.

BACKGROUND

Traffic Engineering (TE) is a technology that is concerned with performance optimization of operational networks. In general, Traffic Engineering includes a set of applications mechanisms, tools, and scientific principles that allow for measuring, modeling, characterizing and control of user data traffic in order to achieve specific performance objectives.

As pressure increases to reduce the cost of network infrastructure, network functions (layers) have begun to converge. For example, networks may have a packet switched backbone (for example, an IP/MPLS backbone) with an underlying transport network where Layers 0/1 are converged (for example, WDM/OTN layers). Carriers are also under increasing pressure to increase profitability per service and to maximize utilization of the network to support as much revenue-generating services as possible. This may include ensuring that services are transported through the network in a cost-efficient manner as well as not using more expensive resources when lower-cost alternatives exist. For carriers, sending all service and traffic types over the packet switched backbone of the network may no longer provide the best economics. For example, the price to transport a bit through a router is much higher than transporting a bit through a transport system, and it may be advantageous to transport the packet flows as flexibly-sized circuits through the transport layers of the network, for example, when packet flows are large enough and circuit-like in nature, thereby avoiding costly processing at the packet layer.

SUMMARY

The problem of efficient utilization of costly infrastructure in an information transport network may be addressed by the use of a network controller and one or more switch, for example, an N×M switch or an OpenFlow switch. The switch may provide a mechanism for switching traffic from a client network to a more optimal core network layer of the information transport network, based on characteristics of the incoming data traffic and/or network information. The characteristics may be detected by a traffic monitor, for example, in the switch on the incoming traffic or as specified from an external source. The intelligence for assessing the incoming traffic and determining the best route through the multi-layer network may be done by the network controller, the network controller having an overall view of the network and available resources and networking related metrics associated with each resource. The network controller may be located outside the network. Based on the network controller analysis, the network controller may configure the switch and/or other network element(s) to steer the client data traffic to the proper layer, as well as the path through the layer to get the data traffic to its destination.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 5A is a schematic diagram of another exemplary logic data flow through the exemplary information transport network of FIG. 4a.

FIG. 5B is a schematic diagram of yet another exemplary logic data flow through the exemplary information transport network of FIG. 4a.

DETAILED DESCRIPTION

Figure 1:
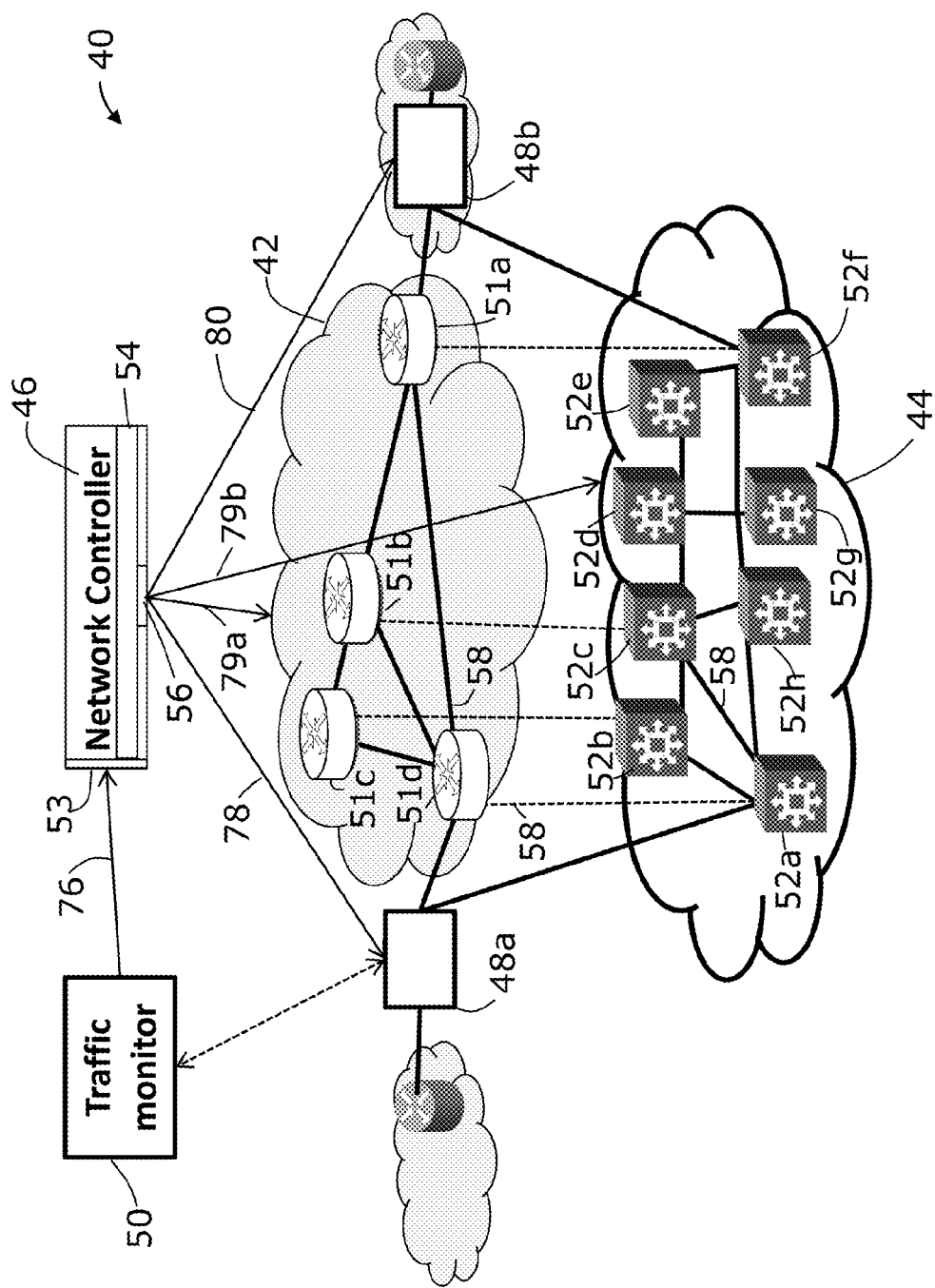
FIG. 1 is a schematic diagram of an exemplary information transport network system constructed in accordance with the present disclosure.

The following detailed description refers to the accompanying drawings. The same reference numbers in different drawings may identify the same or similar elements.

The mechanisms proposed in this disclosure circumvent the problems described above. The present disclosure describes methods and systems for receiving, with circuitry of a network controller, information indicative of characteristics of incoming data traffic in an information transport network, the information transport network comprising at least one packet switched layer and at least one transport layer; determining, with circuitry of the network controller, based on the characteristics of the incoming data traffic, to transport the incoming data traffic through at least one determined layer, the determined layer being at least one of the packet switched layer and the transport layer; determining, with circuitry of the network controller, at least one route for the incoming data traffic through the at least one determined layer; and transmitting, with circuitry of the network controller, a signal containing computer executable instructions to at least one switch, upstream of the information transport network, to configure the switch to steer the incoming data traffic through the at least one route of the at least one determined layer.

In one embodiment, the network controller may have access to network information; and determining, with circuitry of the network controller, to transport the incoming data traffic through the determined layer is based on the characteristics of the incoming data traffic and is further based on the network information. The network information may be indicative of information comprising one or more of resources in the information transport network, availability of the resources, costs of the resources, power consumption, latency, network switching capability, and/or other networking-related metrics.

In one embodiment, the network controller may receive the information indicative of characteristics of incoming data traffic in the information transport network from one or more traffic monitor. The traffic monitor may passively monitor the data traffic and collect performance monitoring data on the network.

In one embodiment, the network controller may comprise an input interface for receiving a signal containing information indicative of characteristics of incoming data traffic in an information transport network before the data traffic enters the information transport network; a processor having a non-transient memory, the processor storing and executing first computer executable instructions to determine, based on the characteristics of the incoming data traffic and/or network information, to transport the incoming data traffic through a determined layer, the determined layer being at least one of a packet switched layer and a transport layer; and an output interface for transmitting a signal to at least one switch, the signal comprising second computer executable instructions to configure the switch to direct the incoming data traffic through the at least one determined layer.

DEFINITIONS

If used throughout the description and the drawings, the following short terms have the following meanings unless otherwise stated:

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in Internet Engineering Task Force RFC 3945.

IETF stands for Internet Engineering Task Force. The Internet Engineering Task Force (IETF) is a volunteer group dedicated to improving the Internet by proposing uniform standards for data transfer protocols, among other things. The IETF has recently extended GMPLS to allow for the transmission of more data through an Optical Transport Network (OTN). The IETF published Requests for Comment (RFC) detailing proposed standard protocols.

IP stands for Internet Protocol which is a protocol used for communicating data across a packet-switched internetwork using the Internet Protocol Suite.

LSP stands for Label Switched Path which is a path through a Generalized Multi-Protocol Label Switching network. Note that Label Switched Paths can be bidirectional or unidirectional; they enable packets to be label switched through the Multiprotocol Label Switched (MPLS) network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OTN stands for Optical Transport Network which includes a set of optical switch nodes which are connected by optical fiber links. ITU-T recommendations G.709 and G.872 define OTN interface requirements and network architecture respectively.

SDN stands for Software Defined Networking. The Open Networking Foundation (ONF) defines SDN protocols for packet-switching platforms, for example, in "Software-Defined Networking: The New Norm for Networks," ONF White Paper, Apr. 13, 2012. One protocol in SDN is known as OpenFlow. In general, OpenFlow allows decoupling the data plane and the control plane and enables remote configuration and switching from a remote central controller. Additionally, Transport SDN is a new area that extends concepts of SDN towards the transport layers of the information transport network system. ONF has not yet defined protocols for managing Transport SDN.

Wave-division multiplexing (WDM) is a type of multiplexing in which two or more optical carrier signals are multiplexed onto a single optical fiber by using different wavelengths (that is, colors) of laser light.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Information transport networks are well known in the art and function to transmit information such as computer data between various computer systems operably coupled to the information network. Client networks may be sending to and receiving information from the information transport networks, for example, through one or more routers. Information transport networks may include one or more packet switched layer (such as an IP/MPLS backbone in the network) and one or more transport layer.

The packet switched layer typically connects computers and establishes an asynchronous "virtual" channel between two or more nodes within the network. In a packet-switched network, a data set, such as a voice signal, is divided into small pieces called packets which are then multiplexed onto high-capacity connections for transmission. Network hardware delivers packets to specific destinations where the packets are reassembled into the original data set. Packet switched networks are distinguished from other multiplexing techniques in that each packet header is inspected to determine where to forward the packet in order to transmit the packet closer to its final destination. A packet may be encapsulated by a computer transmitting the packet into a large network with information about the final delivery of the packet. Typically, data plane protocols are used to facilitate the delivery of data from one computer or end system in a network to another. Data plane protocols generally place information immediately preceding the data to be delivered. The data to be delivered is known as the payload. The information placed in front of the payload is known as the packet header. The packet header generally carries information regarding where and how to deliver the packet. The payload may be followed by other information defined by the protocol, such as a frame check sequence to insure the integrity of the header and payload. The entire packet definition dictated by a particular protocol is known as that protocol's encapsulation. Packet networks make use of data plane protocols which constitute an agreement among parties regarding the encapsulation or modulation of information. At the lowest physical layer, protocols define the modulation of electrical or optical signals. At slightly higher layer protocols, layers define bit patterns used to identify the beginning and end of packets. At this layer and at higher layers, protocols encode information related to the delivery of information across highly complex networks. One example of a packet-switched network is defined by the IEEE 802 standards, including the set of standards within IEEE 802 commonly known as Ethernet. The packet switched layer may be referred to as the IP backbone of the information transport network.

The transport layer may have converged functions, such as combining optical and electronic switching technologies, for example, packet and circuit switching as well as optical transmission capabilities. This is sometimes referred to as Packet Optical Transport Network (P-OTN) or Packet Optical Transport Platform (P-OTP) converged technology—converging optics with packet and OTN technologies. The transport layer may be referred to as the optical transmission cloud or optical transport cloud.

In some instances, the transport network layer may combine Wave Division Multiplexing (WDM), as optical transmission technology to push data over the network fiber, and Optical Transmission Network(s) (OTN), as a switching technology to create variable sized circuits to go over the network. Circuit switching operates by establishing a dedicated connection or circuit between two or more switch nodes within the transport network. Typically, resources are allocated in advance along the path of the connection. Circuit switching operate by creating, maintaining, and transmitting data over a circuit between two network nodes. A network layer utilizing circuit switching usually includes multiple switch nodes (also referred to as "nodes") which are linked together and arranged in a topology referred to in the art as a "mesh network". The nodes may be linked with a physical link including electrical (e.g., copper wire or coax) and/or optical signal (e.g., optical fiber or other waveguide) carrying capabilities, or as a wireless link.

Within the network, user traffic can be transported between any two locations using predefined connections specifying particular links and/or switch nodes for conveying the user traffic. The construction and operation of switch nodes (also referred to as "nodes") is well known in the art. In general, the nodes are generally provided with a control module, input interface(s) and output interface(s). The control modules of the nodes in the OTN function together to aid in the control and management of the OTN. The control modules can run a variety of protocols for conducting the control and management (i.e. Operation, Administration and Maintenance—referred to as OAM) of the OTN. One prominent protocol is referred to in the art as Generalized Multiprotocol Label Switching (GMPLS).

Generalized Multiprotocol Label Switching (GMPLS) is a type of protocol which extends multiprotocol label switching to encompass network schemes based upon time-division multiplexing (e.g. SONET/SDH, PDH, G.709), wavelength multiplexing, and spatial switching (e.g. incoming port or fiber to outgoing port or fiber). Multiplexing, such as time-division multiplexing, is when two or more signals or bit streams are transferred over a common channel. Wave-division multiplexing (WDM) is a type of multiplexing in which two or more optical carrier signals are multiplexed onto a single optical fiber by using different wavelengths (that is, colors) of laser light. OTN structure, architecture, and modeling are further described in the International Telecommunication Union recommendations, including ITU-T G.709, ITU-T G.872, and ITU-T G.805, which are well known in the art. In general, the OTN is a combination of the benefits of SONET/SDH technology and dense wavelength-division multiplexing (DWDM) technology (optics).

Typically, packet switched network systems are interconnected using wavelengths from the optical transmission backbone (the transport layer) that may contain a mix of WDM (optical) transmission and/or OTN (Digital) switching technologies and/or packet switching technologies. Conventionally, traffic engineers may set or pre-engineer a path for a data traffic flow through the packet switched layer of the network, or the path may be computed using native routing protocols within the packet switched layer. When externally engineered, the path of the traffic flow may not be dynamic. In other words, the path does not change if the bandwidth requirement changes. Also, when data traffic is moved from one end of the information transport network to the other end of the information transport network, typically packet traffic switching happens in routers in the IP backbone (the packet switched layer), but when data needs to be transmitted a longer distance, the data traffic may be transmitted along the optical transmission cloud (the transport layer). Data may be transmitted along multiple packet switching hops unnecessarily. Therefore, it may be more efficient to switch a large flow of data traffic at least partially through the transport layer rather than the packet switched layer. For example, it may be more efficient to switch data traffic at least partially through the transport layer if the router resources in the packet switched layer are more expensive than switching data traffic in the transport layer.

Referring now to the figures, FIG. 1 is a schematic diagram of an exemplary information transport network system 40 in accordance with the present disclosure. The network system 40 comprises at least one packet switched layer 42, at least one transport layer 44, at least one network controller 46, and at least one switch 48, such as first and second switches 48a and 48b shown. The network system 40 may further comprise at least one traffic monitor 50.

The packet switched and transport layers 42, 44 will not be described in detail herein, as packet switched and transport layers 42, 44 are well known to those skilled in the art. The transport layer 44 may be known as the optical transmission cloud or the optical transport cloud. The optical transport cloud may also include packet processing capabilities within the system, known as either P-OTN or P-OTP systems, which converge optics with packet and OTN technologies. In one embodiment, the packet switched layer 42 may be the IP/MPLS backbone of the network system 40. In one embodiment, the transport layer 44 may be the WDM/OTN backbone of the network system 40. However, the transport layer 44 may be a mix of any one or more of WDM, OTN, and/or packet technologies.

The packet switched layer 42 may contain one or more router 51 and the transport layer 44 may contain one or more node 52, for example, connected by communication links 58. For purposes of clarity of example, in FIG. 1 four routers 51a-51d and eight nodes 52a-52h are shown and not all communication links 58 are labeled. Of course, as is well known to those skilled in the art, the packet switched layer 42 and the transport layer 44 may contain more, fewer, and/or other network elements and/or network system participants, such as, but not limited to, other routers 51, nodes 52, switches 48 and/or other network controllers 46, for instance. In one embodiment, one or more router 51 may include switches 48 such as open flow switches.

The network controller 46 may have a logically centralized view of the global topology of the information transport network system 40, across layers, vendors, and domains, and may have a global view of the information transport network system 40 demands and resources. The network controller 46 may have a global view of different layers of the network system 40, including the at least one packet switched layer 42 and the at least one transport layer 44. The network controller 46 may comprise at least one input interface 53, at least one processor 54, and at least one output interface 56. The network controller 46 may contain one or more non-transient memory (not shown). In general, the network controller 46 has computer intelligence to reprogram the network system 40 for more efficient resource utilization. It should be understood that the network controller 46 may share one or more components with other devices, for example, a network server.

When adjustments are needed in the network system 40 to more efficiently use network resources, such as nodes, bandwidth, switches, routers, servers, etc., the network controller 46 can reconfigure the network system 40 so data traffic can move more efficiently through the network system 40. The network controller 46 may be located at a centralized and/or remote location from the packet switched and transport layers 42, 44. The network controller 46 may be located outside of the network layers/elements or within one or more of network elements, such as nodes 52, switches 48, routers 51, and/or servers (not shown). The network controller 46 may be distributed amongst multiple servers, with the logically centralized network topology information, the information spanning layers/vendors/domains/etc. In one embodiment, the network controller 46 may be a combination of hardware and software. In one embodiment, the network controller 46 may comprise a server processor with a series of computer executable instructions. In one embodiment, the network controller 46 may be based in a software application.

The network controller 46 may control the switches 48a, 48b located at the ingress and the egress of the network system 40. The network controller 46 may also control the packet switched layer 42 and/or the transport layer 44, and/or any combination of the switches 48a, 48b, the packet switched layer 42, and/or the transport layer 44. The network controller 46 may control the entire network system 40 or any combination of network elements. In one embodiment, multiple network controllers 46 may be used to control different network elements and/or different network layers. In one embodiment, network controllers 46 may be layered such that one or more network controller 46 is controlled by another network controller 46.

In one embodiment, the network controller 46 may be a Software Defined Network Controller 46. The software defined network controller 46 may be utilized for Packet Systems Software Defined Networking (Packet SDN) and/or Transport Systems Software Defined Networking (Transport SDN). Packet SDN may utilize protocols defined by the Open Networking Foundation (ONF), such as in the publication "Software-Defined Networking: The New Norm for Networks," ONF White Paper, Apr. 13, 2012. One protocol in SDN is known as OpenFlow. Transport SDN extends concepts of SDN towards the transport layers of the information transport network system 40. The Open Networking Foundation has not yet defined protocols for managing SDN for transport systems.

In general, Software Defined Networking (SDN) is network architecture where the control plane is separate, logically centralized, and decoupled from the forwarding plane, which may be embodied by the network devices/elements, such as switches 48, nodes 52, routers 51, etc. Network intelligence may be centralized in one or more software defined network controllers 46, enabling programmability of the network from a remote central controller. SDN allows access to, and manipulation of, the forwarding plane of network devices, such as is facilitated by programmable flow tables in packet systems, as is described in the publication "Software-Defined Networking: The New Norm for Networks." The software defined network controller 46 typically has an overall view of the network system 40 and the available resources, as well as the relative costs associated with the available resources. The software defined network controller 46 can be used to control the overall network system 40 from a centralized and/or remote point. The software defined network controller 46 can be used to output instructions to, and/or manage, one or more network devices/elements.

The at least one switch 48 may be external to the packet switched and transport layers 42, 44, for example, located at one or more edge of the packet switched and transport layers 42, 44. In one embodiment, the at least one switch 48 may be located upstream from the at least one packet switched layer 42 and the at least one transport layer 44. In one embodiment, the switch 48 may be configured to passively tap the data traffic source and monitor data traffic characteristics. In one embodiment, the at least one switch 48 includes the first switch 48a and the second switch 48b. The second switch 48b may be located downstream from the at least one packet switched layer 42 and the at least one transport layer 44. Of course, it should be understood that information flow may be bidirectional through the network system 40.

The at least one switch 48 may be an N×M digital switch 66 and/or an OpenFlow packet switch 68 (as shown in FIGS. 3 and 4) and may be controlled by the network controller 46. Protocols for OpenFlow for transport systems for N×M digital switches have not yet been defined by protocol-establishing bodies, such as the Open Networking Foundation. The at least one switch 48 may function at layer 0, 1, 2, 3, and so on. Nonexclusive examples of the at least one switch 48 include digital or optical switches, packet switches, digital transport switches, or wavelength switches, or some combination thereof.

In one embodiment, the information transport network system 40 includes at least one traffic monitor 50. One or more traffic monitors 50 may exist throughout the information transport network system 40. The traffic monitor(s) 50 may monitor the at least one packet switched layer 42 and the at least one transport layer 44. The traffic monitor 50 may monitor the packet switched layer 42 and the transport layer 44 at one or more edge point of the layers 42, 44, and/or at one or more points in the information transport network system 40 where decisions to switch between layers may be implemented. The traffic monitor 50 may passively monitor data traffic before the data traffic enters the layers 42, 44 without disrupting the flow of the data traffic. Monitoring may include, for example, collecting performance monitoring data on the network, collecting statistics on local interface, duplicating data traffic to another monitoring point on the network system 40, and so on. In one embodiment, the traffic monitor 50 may include a software application executed by suitable hardware to proactively monitor data traffic coming into the layers 42, 44. In one embodiment, the traffic monitor 50 may collect data from any part of the network system 40.

The traffic monitor 50 may apply logic to determine characteristics of incoming data traffic. Nonexclusive examples of characteristics of the incoming data traffic may include size, bandwidth requirements, latency, jitter/wander of signal, performance, packet loss, conditions that may affect the integrity/performance of the signal, cost to utilize resources, utilization of resources, power consumption of traffic, other network performance metrics, etc. The traffic monitor 50 may pass the data traffic's characteristics information to the network controller 46. For example, the traffic monitor 50 may send a first signal 76 to the network controller 46. The first signal 76 may contain information indicative of characteristics of the incoming data stream 60. Alternatively, the network controller 46 may pull the information indicative of characteristics of the incoming data traffic from the traffic monitor 50 or from elsewhere in the network system 40.

In one embodiment, the traffic monitor 50 may be a participant in the network system 40 but located separately from network elements within the network system 40. In one embodiment, the traffic monitor 50 may be part of one or more network elements, for example, located in or as part of one or more server or switch 48. In one embodiment, the traffic monitor 50 may be combined with the first switch 48a. The traffic monitor 50 and the network controller 46 may be implemented with one or more multiple processors running in a distributed environment. Of course, it should be understood that the information can be provided to the network controller 46 from other sources, such as within the at least one switch 48 and/or from an external source.

Figure 2:
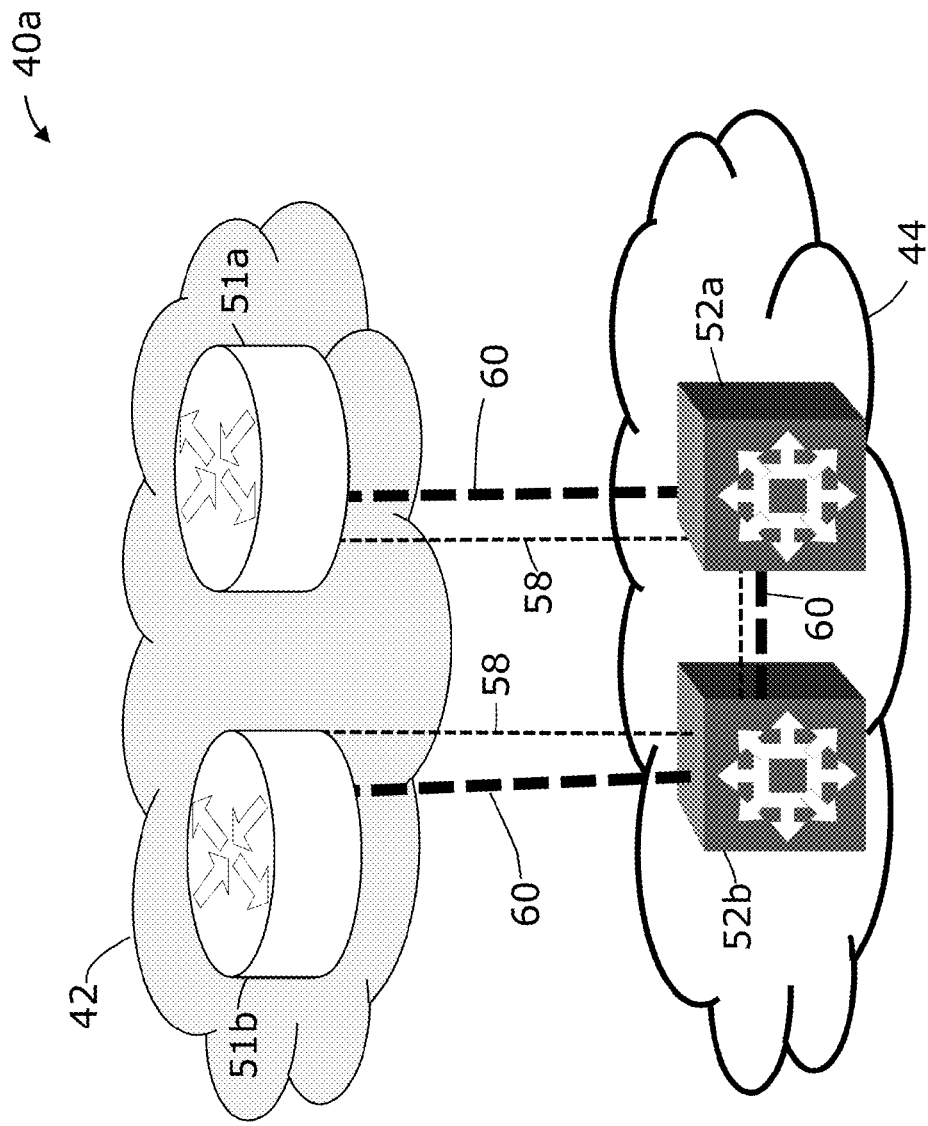
FIG. 2 is a schematic diagram of an exemplary physical data path in accordance with the present disclosure.

It should be understood that the schematic diagrams shown herein represent exemplary logical data paths, rather than physical data paths. As is well known by those skilled in the art, the physical data path between the packet switched layer 42 and the transport layer 44 (the transport network) may more closely resemble the schematic of FIG. 2. In FIG. 2, a data stream 60 is shown along the physical data path cycling between the router 51a in the packet switched layer 42 and the nodes 52a, 52b in the transport layer 44 and the router 51b in the packet switched layer 42 of an exemplary information transport network system 40a. The routers 51a, 51b and the nodes 52a, 52b may be connected via one or more communication link 58. A logical flow path would simply show the data stream 60 moving between routers 51a and 51b, without showing details of the physical path.

Figure 3A:
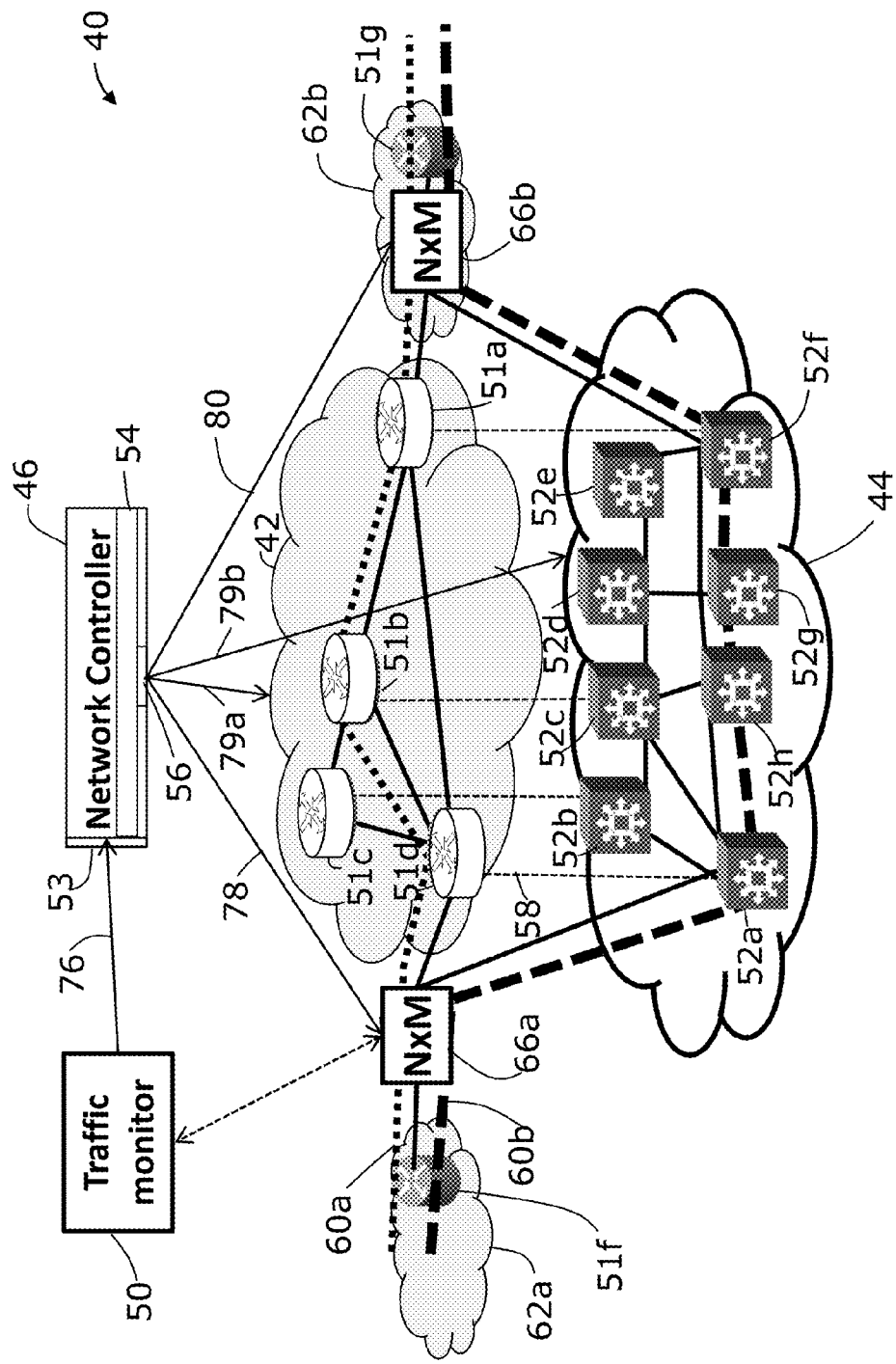
FIG. 3A is a schematic diagram of an exemplary logical data flow through the network system of FIG. 1 in accordance with the present disclosure.

Referring now to FIG. 3A, FIG. 3A is a schematic diagram of the exemplary network system 40 of FIG. 1 illustrating an exemplary logical data flow in accordance with the present disclosure. In the embodiment in FIG. 3A, the switch 48 may be configured to switch entire data streams 60 from a client network 62 to a single output port, for example, steering the entire data stream 60 through either the packet switched layer 42 or the transport layer 44. One example of such a switch 48 is an N×M digital switch 66, in which "N" input ports can switch to "M" output ports. Details of digital switch internal construction are well known by those skilled in the art and will not be further explained herein.

In this example, data stream 60a and data stream 60b may enter and/or leave (if bi-directional data flow) the first switch 66a from, and/or to, a network device/element in a client network 62a, such as a client router 51f. In this example, the first switch 66a is a digital switch, such as an N×M switch, configured to transfer an entire section of the data stream 60. The N×M digital switch 66a may switch a whole wavelength of the data stream 60. For example, if the data stream 60 with a 10 Gbit signal enters the switch 66a, the entire signal may be switched to a single port. The N×M digital switch 66a may not split data traffic into multiple ports. Alternatively, the N×M digital switch 66a may split data into multiple ports using various multiplexing techniques, such as WDM or TDM (not shown).

The traffic monitor 50, here depicted as separate from network elements for purposes of clarity, may monitor the incoming data stream 60, for example, as the data stream 60 enters the first switch 66a. The traffic monitor 50 may passively monitor the incoming data stream 60 without disrupting the data traffic. Monitoring may include, for example, collecting statistics on local interface, duplicating data traffic to another monitoring point on the network system 40, and so on. The traffic monitor 50 may determine characteristics of the incoming data traffic. Nonexclusive examples of characteristics of the incoming data traffic may include size, bandwidth requirements, latency, jitter/wander of signal, performance, packet loss, conditions that may affect the integrity/performance of the signal, cost to utilize resources, utilization of resources, power consumption of traffic, etc. The traffic monitor 50 may send a first signal 76 to the network controller 46 containing information indicative of characteristics of the incoming data stream 60. Of course, it should be understood that the information can be provided from other sources, such as within the switch 48 and/or from an external source.

The network controller 46 may receive, through the input interface 53, the first signal 76 from the traffic monitor 50 containing the information indicative of characteristics of incoming data traffic. The processor 54 of the network controller 46 may include non-transient memory (not shown) storing computer executable instructions and may execute the instructions to determine, based on the characteristics of the incoming data traffic, to transport the incoming data traffic through a determined layer—that is, through at least one of the packet switched layer 42 and/or through at least one of the transport layer 44. For example, if the information indicative of characteristics of the incoming data traffic shows that the data traffic is a large flow that would be expensive to switch through the packet switched layer 42, the network controller 46 may determine to transport the incoming data traffic through the transport layer 44. The network controller 46 may have access to, or be provided with, network information indicative of resources in the information transport network system 40, such as performance, the resources in the network system 40, the availability of the resources, the cost of the resources, and the expense of switching in the packet switched layer 42 versus the transport layer 44, power consumption, latency, network switching capability, other networking-related metrics, etc. The network controller 46 may determine which layer(s) 42, 44 to use in the network system 40 based on a combination of the characteristics of the incoming data traffic and the network information regarding the network resources, for example. The network controller 46 may also determine at least one route for the incoming data traffic through the determined layer(s) 42, 44. If the network controller 46 determines routing for the data traffic, GMPLS capabilities can be leveraged, for example, for signaling. Additionally or alternately, GMPLS protocols may be utilized for routing.

The network controller 46 may then transmit one or more second signal 78 containing computer executable instructions through the output interface 56 to the first switch 66a to configure the first switch 66a to steer the incoming data traffic through the at least one route of the at least one determined layer. The network controller 46 may send the second signal 78, or other signals 79a, 79b to the packet switched layer 42 and/or the transport layer 44 and/or any of the network elements to control the path of the incoming data.

In the example illustrated in FIG. 3A, the first switch 66a is a digital switch 66a, such as an N×M switch, configured to transfer an entire section of a particular data stream 60. Therefore, in this example, the network controller 46 would configure the digital switch 66a to send the data traffic along one route in one or more network layer 42, 44. In FIG. 3A, an example of two data streams 60a, 60b is shown, the first data stream 60a being routed through routers 51d-51b-51a in the packet switched layer 42 and the second data stream 60b being routed through nodes 52a-52h-52g-52f in the transport layer 44.

The network controller 46 may also transmit a third signal 80 containing computer executable instructions through the output interface 56 to the second switch 66b, shown in FIG. 3A as an N×M digital switch 66b, to configure the second switch 66b. The second switch 66b may be configured to steer the exiting data traffic to a device in an external client network 62b, for example, to a router 51g. Of course, it should be understood that the network system 40 may be bi-directional and that the switches 66 may be configured to switch both incoming and outgoing data traffic.

Figure 3B:
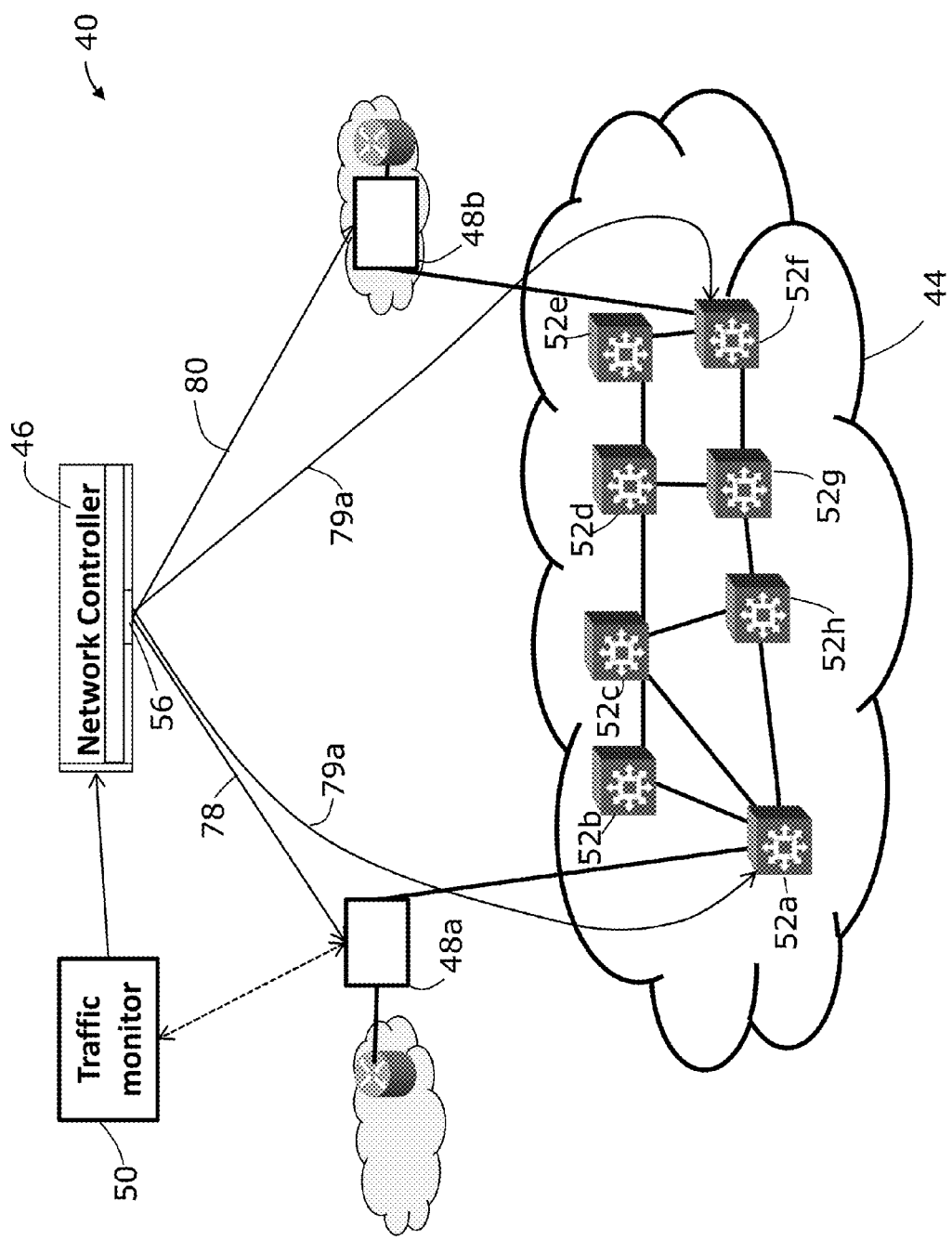
FIG. 3B is a schematic diagram of an exemplary embodiment of a portion of the network system of FIG. 3A in accordance with the present disclosure.

The network controller 46 may communicate computer executable instructions to steer the data stream 60 through the determined layers and routes in an implicit mode and/or an explicit mode. For example, FIG. 3B illustrates a portion of the network system 40 showing the network controller 46 communicating in the implicit mode. In the implicit mode, the network controller 46 may send one or more signal(s) 79a to the edge node(s) 52, such as edge nodes 52a, 52f, of the transport layer 44 to configure the edge nodes 52a, 52f. Then the network elements, such as the nodes 52b-52e, 52g, and 52h, are configured within the optical cloud (i.e. the transport layer 44) to control the path of the data stream 60.

Figure 3C:
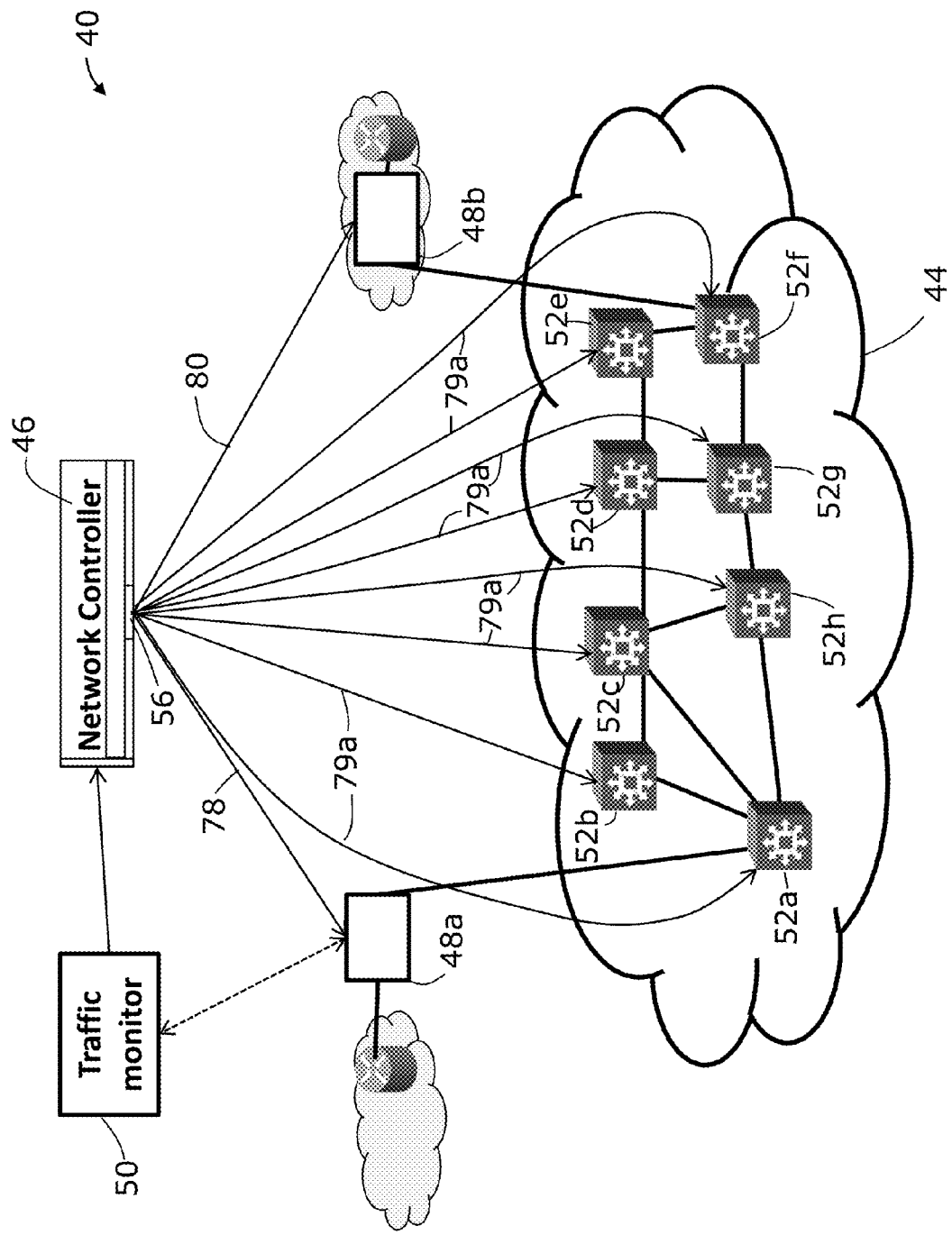
FIG. 3C is a schematic diagram of another exemplary embodiment of a portion of the network system of FIG. 3A in accordance with the present disclosure.

Alternatively, as shown in the portion of the network system 40 illustrated in FIG. 3C, in the explicit mode, the network controller 46 may send one or more signal(s) 79a to each of one or more network elements, for example, nodes 52a-52h, to configure each of the one or more network elements directly in the transport layer 44. Of course, it should be understood that the implicit and explicit modes may be used to communicate with and configure other network elements and/or network elements in other layers, such as the packet switched layer 42.

Figure 3D:
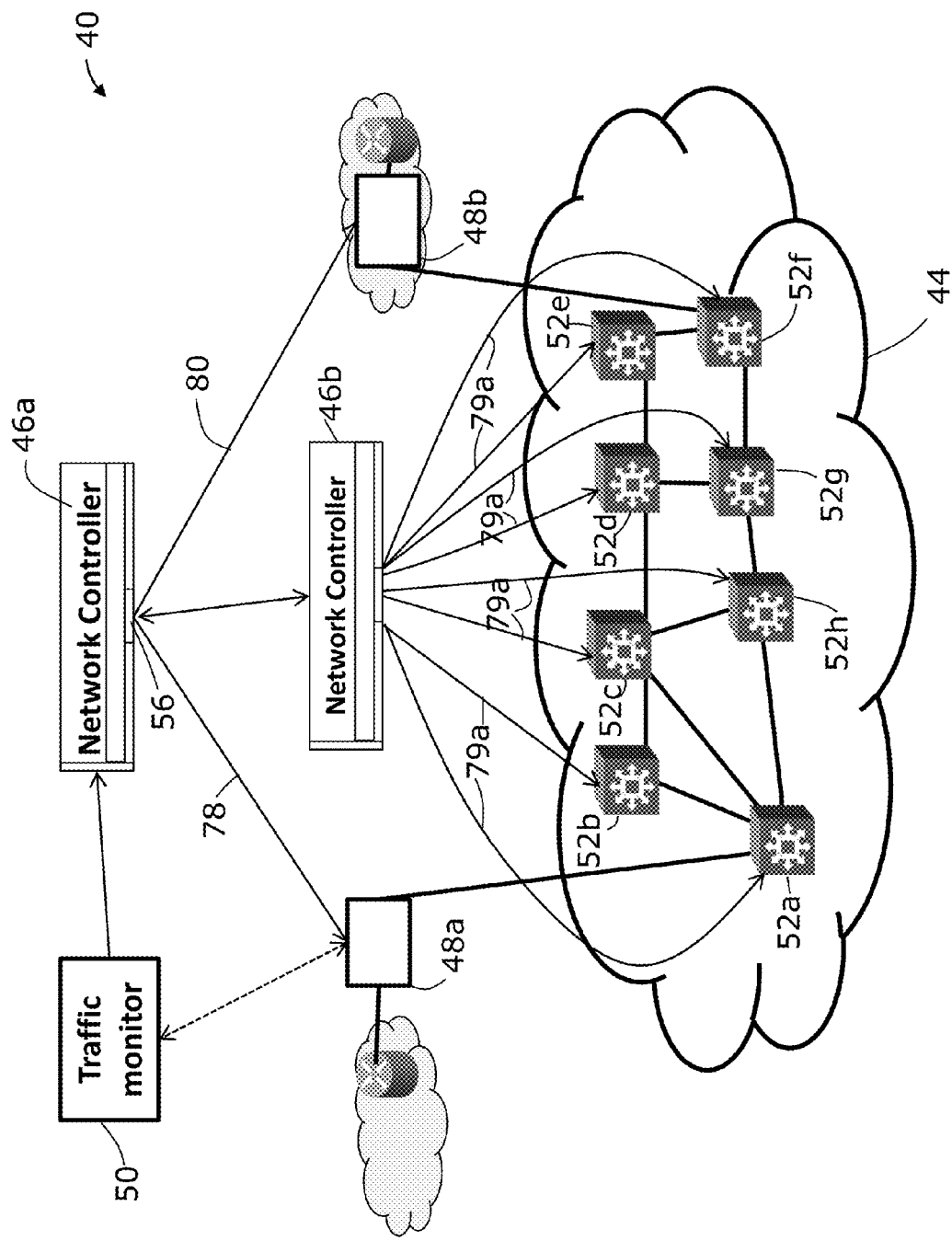
FIG. 3D is a schematic diagram of yet another exemplary embodiment of a portion of the network system in accordance with the present disclosure.

In one embodiment, depicted in the schematic diagram of a portion of the network system 40 of FIG. 3D, more than one network controller 46 may be utilized. In this example, a first network controller 46a and a second network controller 46b are shown, however, it should be understood that any number of network controllers 46 may be used. In one embodiment, the second network controller 46b may communicate with the network elements. The second network controller 46b may also communicate with the first network controller 46a, providing information to the first network controller 46a and receiving instructions from the first network controller 46a in order to configure the network elements. FIG. 3D illustrates the second network controller 46b communicating with, and controlling, network elements such as the edge nodes 52a, 52f, and/or other nodes 52b-52e,52g, 52h, in the transport layer 44. However, it should be understood that the second network controller 46b could control any portion of the network system 40b, such as switches 48 and/or routers 51 in the packet switched layer 42 (not shown).

Figure 4A:
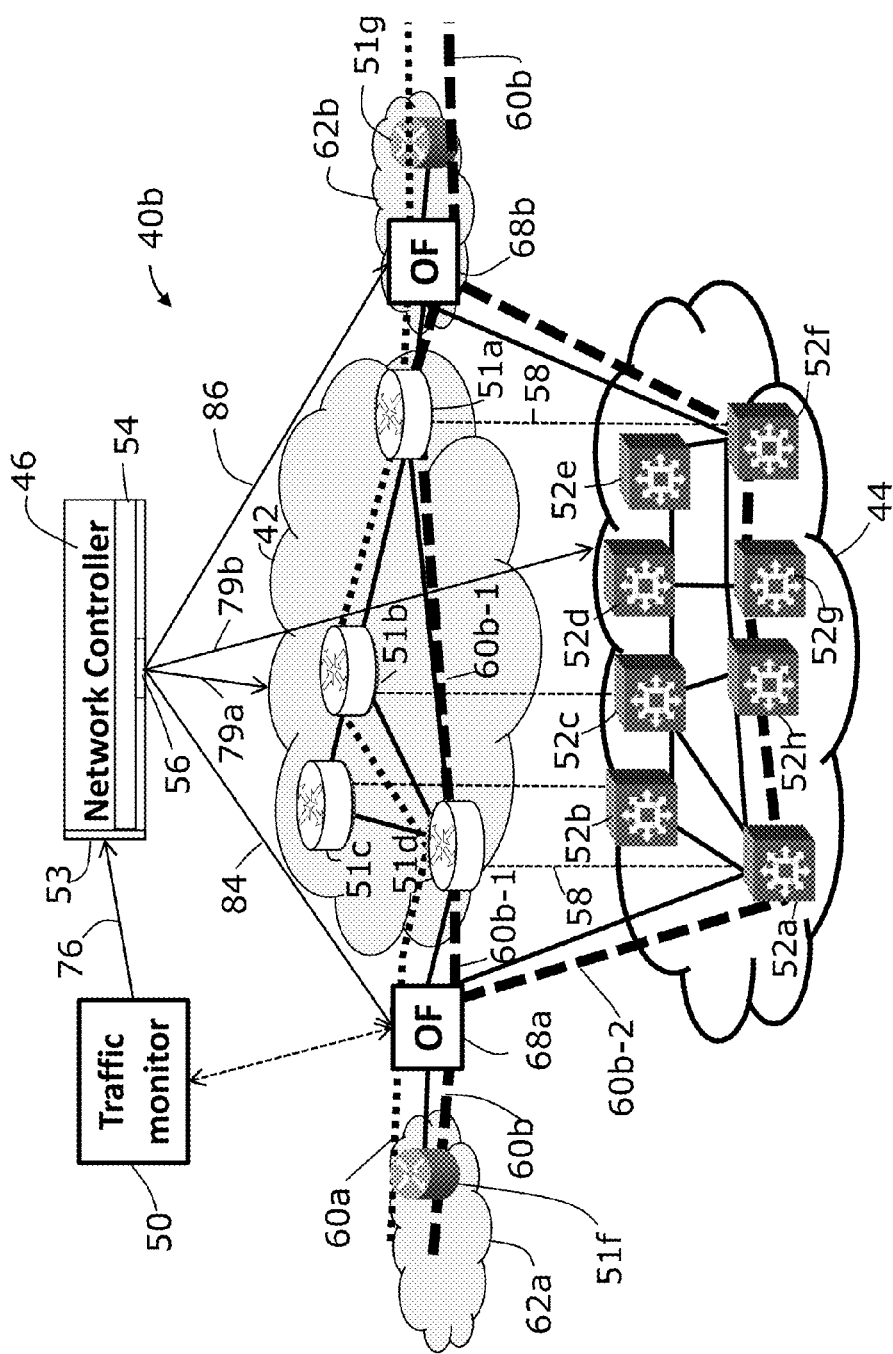
FIG. 4A is a schematic diagram of another embodiment of an exemplary logical data flow through the information transport network system constructed in accordance with the present disclosure.

In one embodiment of the network system 40b, depicted in the schematic diagram of a logical data flow of FIG. 4A, the at least one switch 48 may be configured to switch parts of data streams 60, for example, a first flow data stream 60b-1 and a second flow data stream 60b-2, through multiple ports. The at least one switch 48 may be configured by the network controller 46 to steer, for example, the first flow data stream 60b-1 through the packet switched layer 42 and the second flow data stream 60b-2 through the transport layer 44. The first switch 48a and/or the second switch 48b may be a packet switch 68, such as OpenFlow packet switches 68a and 68b as shown. An OpenFlow packet switch 68 may be adapted to receive multiple data flows and to route multiple data flows through a single receiving port, for example, in a router 51. OpenFlow packet switches 68 are further described by the Open Networking Foundation, for example, as described in the provisional document "OpenFlow Switch Specification," Version 1.3.2 (Wire Protocol 0x04), Apr. 25, 2013. In general, an OpenFlow packet switch 68 uses packet switching traffic. For example, information coming into the OpenFlow packet switch 68 might be through an optical interface (e.g. 10 Gbit optical interface) but the OpenFlow packet switch 68 can examine multiple data packets coming into the input port and can switch individual packets to any out-going port. The OpenFlow packet switch 68 can be controlled by OpenFlow protocols that can be managed by the network controller 46. The OpenFlow packet switch 68 allows the network controller 46 to make finer level granular decisions about which incoming packets to switch from one layer to another layer. This allows the network controller 46 to send some packets to the packet switched layer 42 and some packets to the transport layer 44 based on, for example, network information and/or characteristics of the incoming data traffic.

Additionally, the packet switches 68a, 68b may be capable of receiving multiple flows of data streams 60 through a port. The flows of data streams 60 may be differentiated, for example, by V-LAN tags. The packet switches 68a, 68b may route one flow of data stream 60 through one layer and another flow of data stream 60 through a different or same layer.

For example, in FIG. 4A, the OpenFlow packet switch 68a receives the data streams 60a and 60b. The traffic monitor 50 monitors the incoming data streams 60a, 60b, and transmits performance monitoring information in the first signal 76 to the network controller 46. Again, the first signal 76 may contain information indicative of characteristics of the data streams 60*a*, 60*b*. The traffic monitor 50 does not impact the data plane flow. The network controller 46 determines, with circuitry of the network controller 46, for example, the processor 54 running computer executable instructions, to transport the incoming data traffic through determined layers and/or routes based on the information indicative of characteristics of the data streams 60*a*, 60*b*, and/or on network information indicative of networking-related metrics associated with resources in the information transport network system 40*b*.

In this example, the network controller 46 determines to send data stream 60*a* and a portion of data stream 60*b* (here shown as first flow data stream 60*b*-1) through the packet switched layer 42. The network controller 46 determines to send a portion of data stream 60*b* (here shown as second flow data stream 60*b*-2) through the transport layer 44. The network controller 46 may send a fourth signal 84 to the OpenFlow packet switch 68*a* to configure the OpenFlow packet switch 68*a* to send the data streams 60*a*, 60*b*-1, and 60*b*-2, through the determined layers and/or along determined network routes.

In the example shown in FIG. 4A, the switch 68*a* is configured to send data stream 60*a* through routers 51*d*-51*b*-51*a* in the packet switched layer 42 to the egress switch 68*b*. Data stream 60*b*-1 is sent through routers 51*d* and 51*a* in the packet switched layer 42 to the egress switch 68*b*; while data stream 60*b*-2 is sent through nodes 52*a*-52*h*-52*g*-52*f* in the transport layer 44 to the egress switch 68*b*. The egress switch 68*b* may then send the data to the client router 51*g* in the client network 62*b*. As previously described, the network controller 46 may communicate in implicit mode and/or explicit mode to network elements in the packet switched layer 42 and transport layer 44 to cause configuration of the network elements, for example, with one or more signals 79*a*, 79*b*.

The network controller 46 may also transmit the fifth signal 86 containing computer executable instructions to the second packet switch 68*b* at the network egress to configure the second packet switch 68*b* to recombine the data packets before the data traffic enters the client network 62*b*. For example, as shown in FIG. 4A, signal 84 causes the second packet switch 68*b* to recombine data streams 60*b*-1 and 60*b*-2. Alternatively, the network controller 46 may transmit the fifth signal 86 containing computer executable instructions to another network element to recombine the data packets upstream of the second packet switch 68*b*.

Figure 4B:
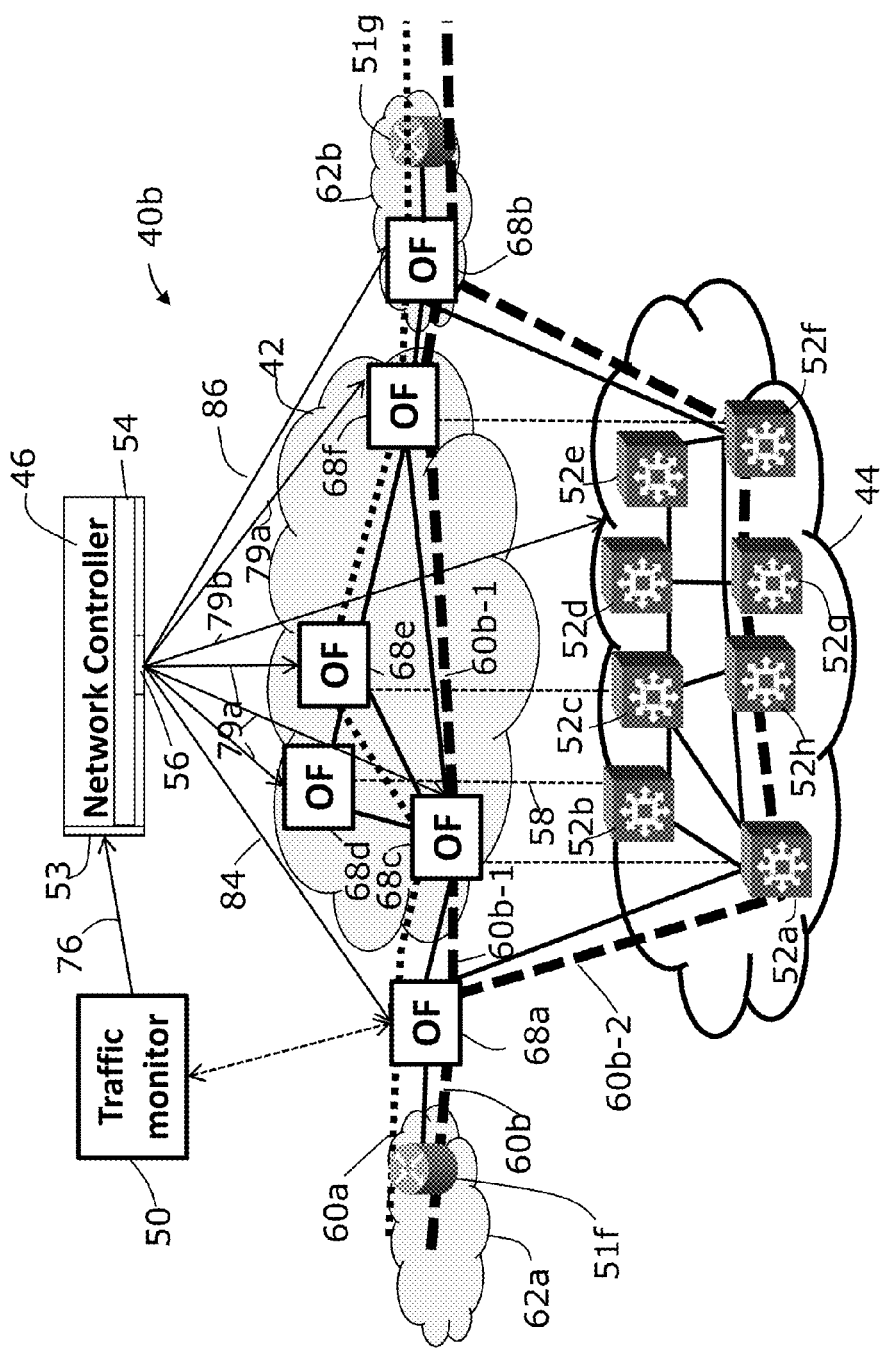
FIG. 4B is a schematic diagram of the information transport network system of FIG. 4A with alternative network elements.

In one embodiment, as depicted in FIG. 4B, one or more of the routers 51*a* in the packet switched layer 42 are also OpenFlow packet switches 68*c*-68*f*. The OpenFlow packet switches 68 may be configured and controlled by the network controller 46.

Figure 5A:
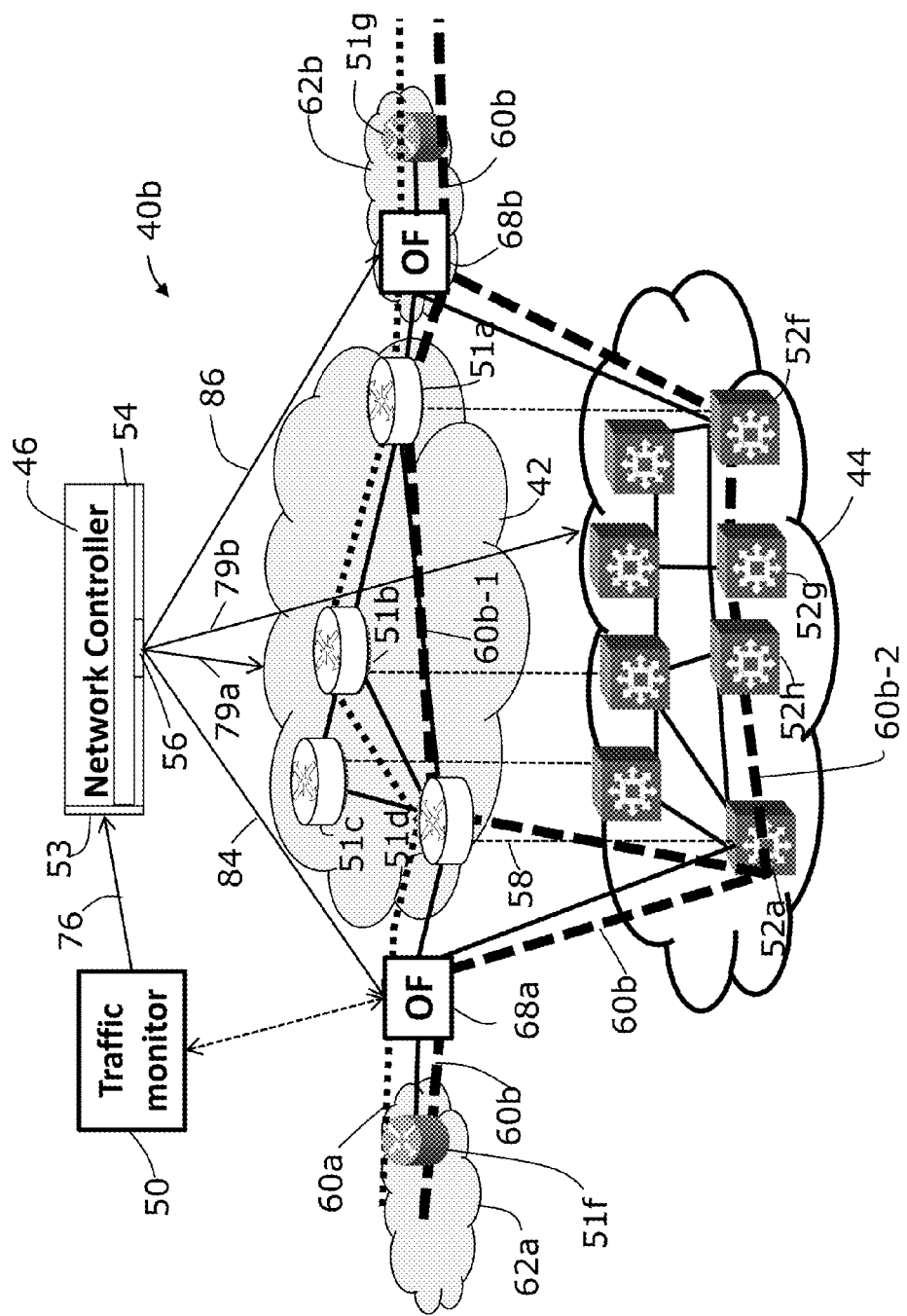

FIG. 5A is a schematic diagram of another exemplary logic data flow of the exemplary information transport network 40*b* of FIG. 4A. In this example, the network controller 46 has determined, based on information indicative of characteristics of the data streams 60*a*, 60*b* and/or on network information indicative of networking-related metrics, to transport the data stream 60*b* through the transport layer 44 for part of the route, and then to split the data stream 60*b* and transport the first portion of the data stream 60*b*-1 through the packet switched layer 42 and the second portion of the data stream 60*b*-2 continuing through the transport layer 44. The network controller 46 may transmit one or more signals 79*a*, 79*b*, 84, 86 to configure the network elements to steer the portions of the data stream 60*b*-1, 60*b*-2, along the determined layers and routes. Again, the network controller 46 may communicate with the network elements in implicit mode or explicit mode. For purposes of clarity, not all signals are shown in FIG. 5A.

In this example, the data stream 60*b*-2 is routed to node 52*a* in the transport layer 44. Then the first portion of the data stream 60*b*-1 is routed through routers 51*d*-51*a* in the packet switched layer 42, while the second portion of the data stream 60*b*-2 is routed through nodes 52*a*-52*h*-52*g*-52*f*. The first portion of the data stream 60*b*-1 and second portion of the data stream 60*b*-2 may be recombined at the egress switch 68*b*.

Figure 5B:
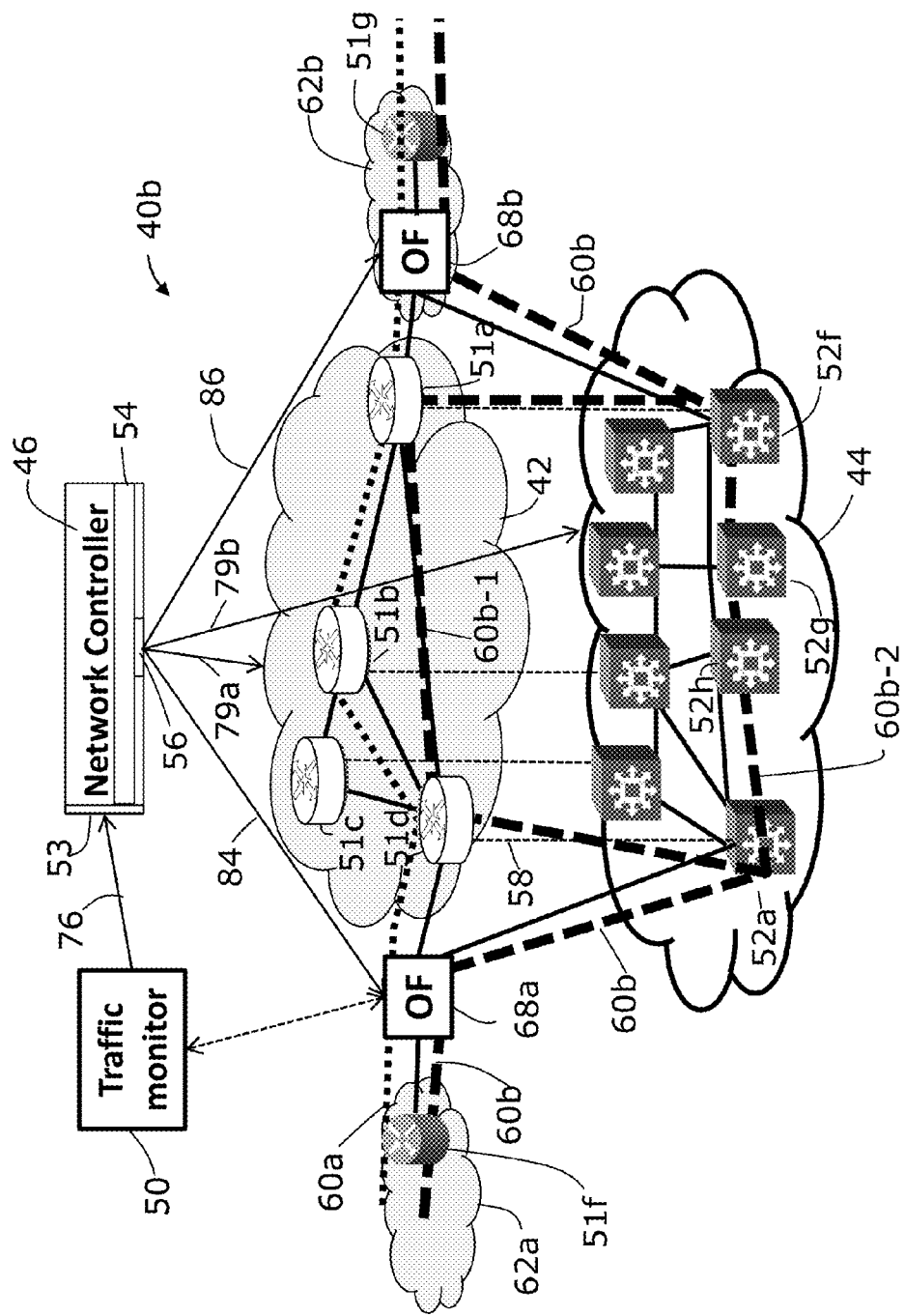

Alternatively, as shown in FIG. 5B, the first portion of the data stream 60*b*-1 and second portion of the data stream 60*b*-2 may be recombined within the transport layer 44, such as at node 52*f*, for example.

Figure 6A:
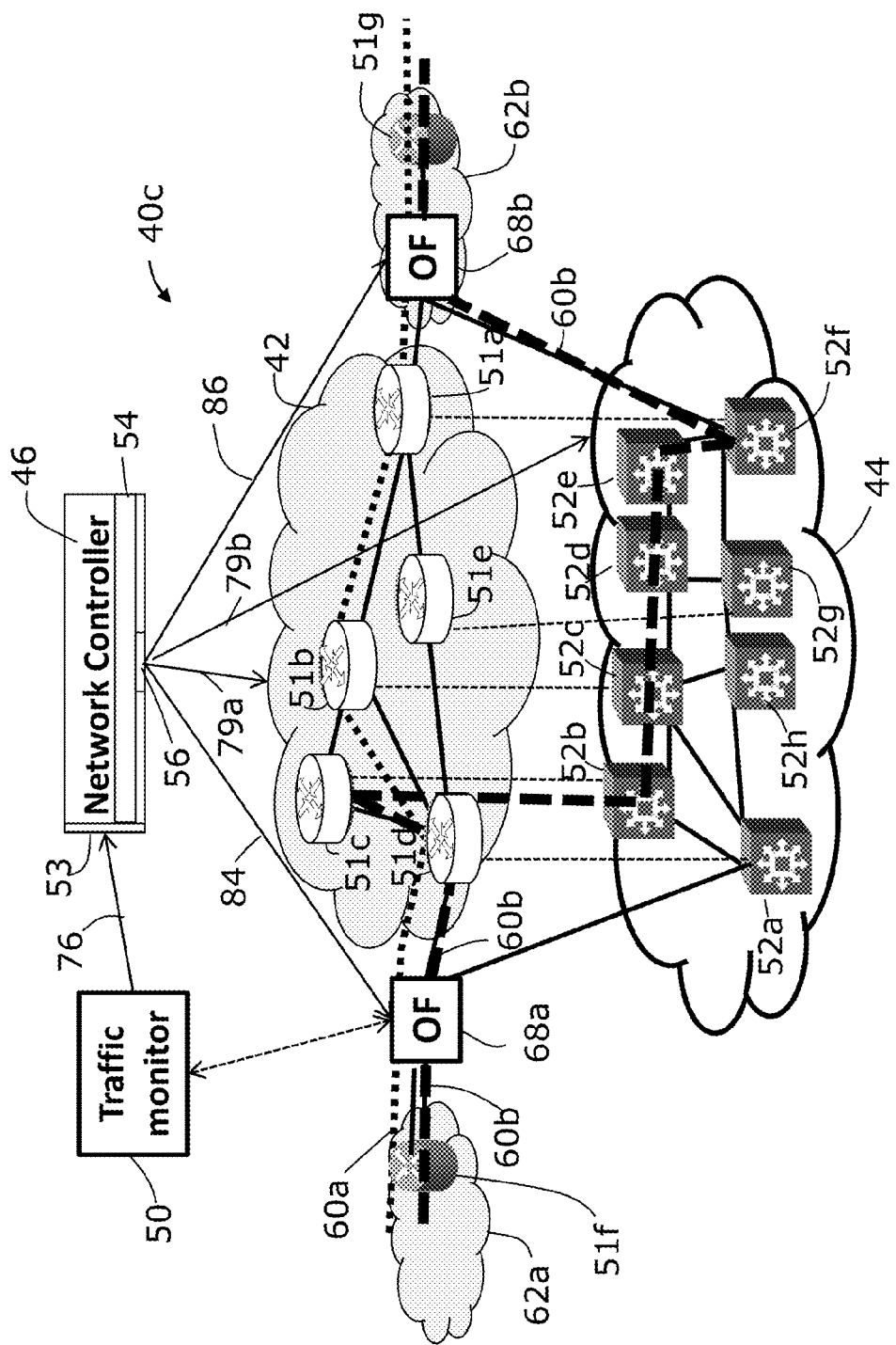
FIG. 6A is a schematic diagram of an exemplary logic data flow through another exemplary information transport network in accordance with the present disclosure.

FIG. 6A is a schematic diagram of an exemplary logic data flow through another exemplary information transport network 40*c* in accordance with the present disclosure. In this example, the network controller 46 has determined, based on the data traffic characteristics and/or network information, to route the data stream 60*b* through the packet switched layer 42 for part of the route, and then to route the entire data stream 60*b* through the transport layer 44. The network controller 46 may transmit one or more signals 79*a*, 79*b*, 84, 86 to configure the network elements to steer the data stream 60*b* along the determined layers and routes. The network controller 46 may communicate with the network elements in implicit mode or explicit mode. For purposes of clarity, not all signals are shown. In this example, the data stream 60*b* incoming from the client router 51*f* is switched to routers 51*d*-51*c* in the packet switched layer 42, then to nodes 52*b*-52*c*-52*d*-52*e*-52*f* in the transport layer 44, then to the switch 68*b* at the egress of the network system 40*b*, and then to the client router 51*g*.

Figure 6B:
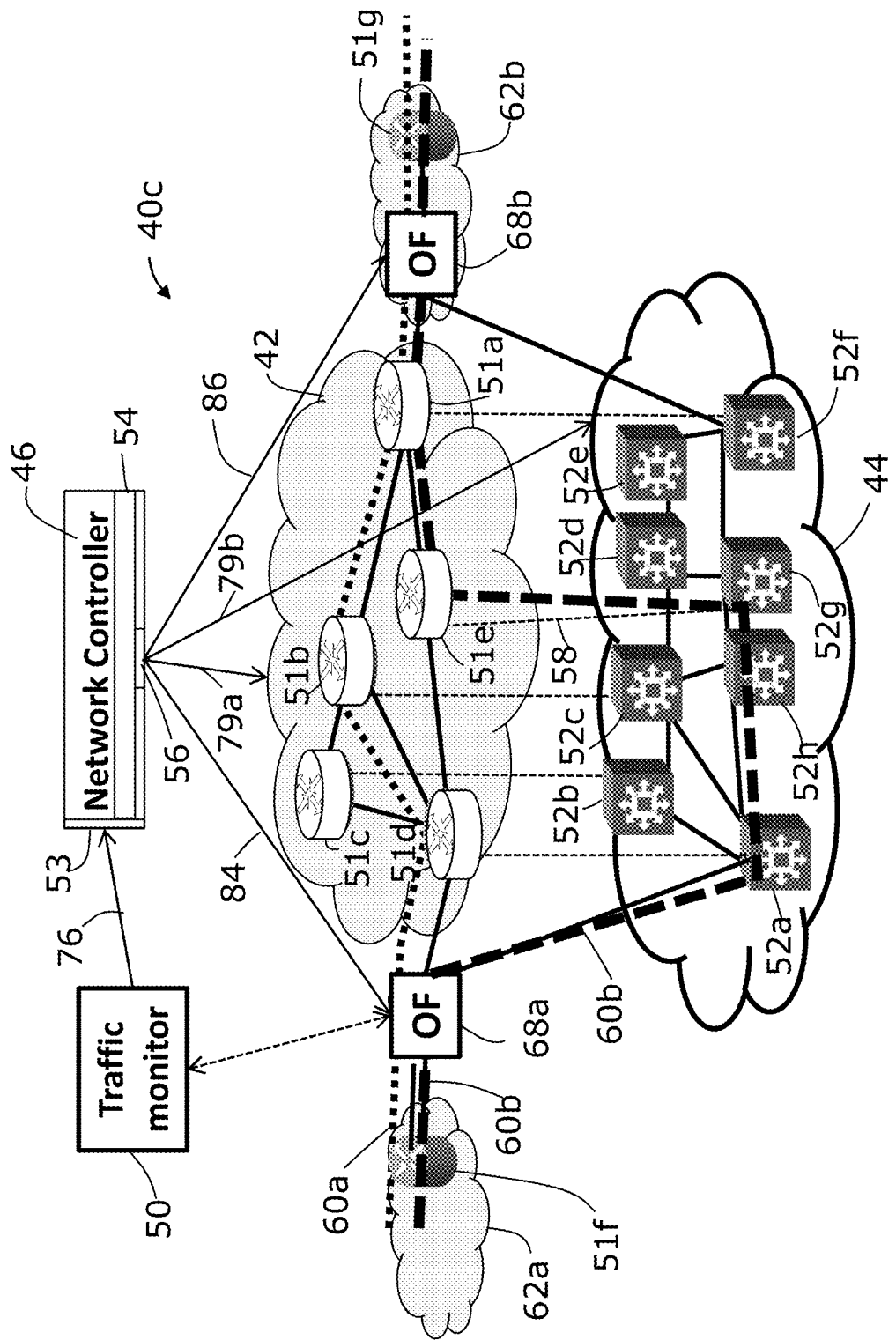
FIG. 6B is a schematic diagram of another exemplary logic data flow through the exemplary information transport network of FIG. 6A.

FIG. 6B is a schematic diagram of an exemplary logic data flow of the exemplary information transport network 40*c* of FIG. 6A, in which the network controller 46 may determine, based on the characteristics of the incoming data traffic and/or based on network information, to route the data traffic first to the transport layer 44 then to the packet switched layer 42. In this example, the data stream 60*b* incoming from the client router 51*f* is routed to nodes 52*a*-52*h*-52*g* in the transport layer 44, then to routers 51*e*-51*a* in the packet switched layer 42, then to the digital switch 68*b* at the egress of the network system 40*b*, and then to the client router 51*g* in the client network 62*b*.

Of course, it should be understood that the network system 40 configurations shown are merely examples and the network system 40 may be comprised of more, fewer, or different network elements and/or participants, such as different types or numbers of switches 48, routers 51*a*, nodes 52, network controllers 46, traffic monitors 50, or other network elements/participants.

Figure 7:
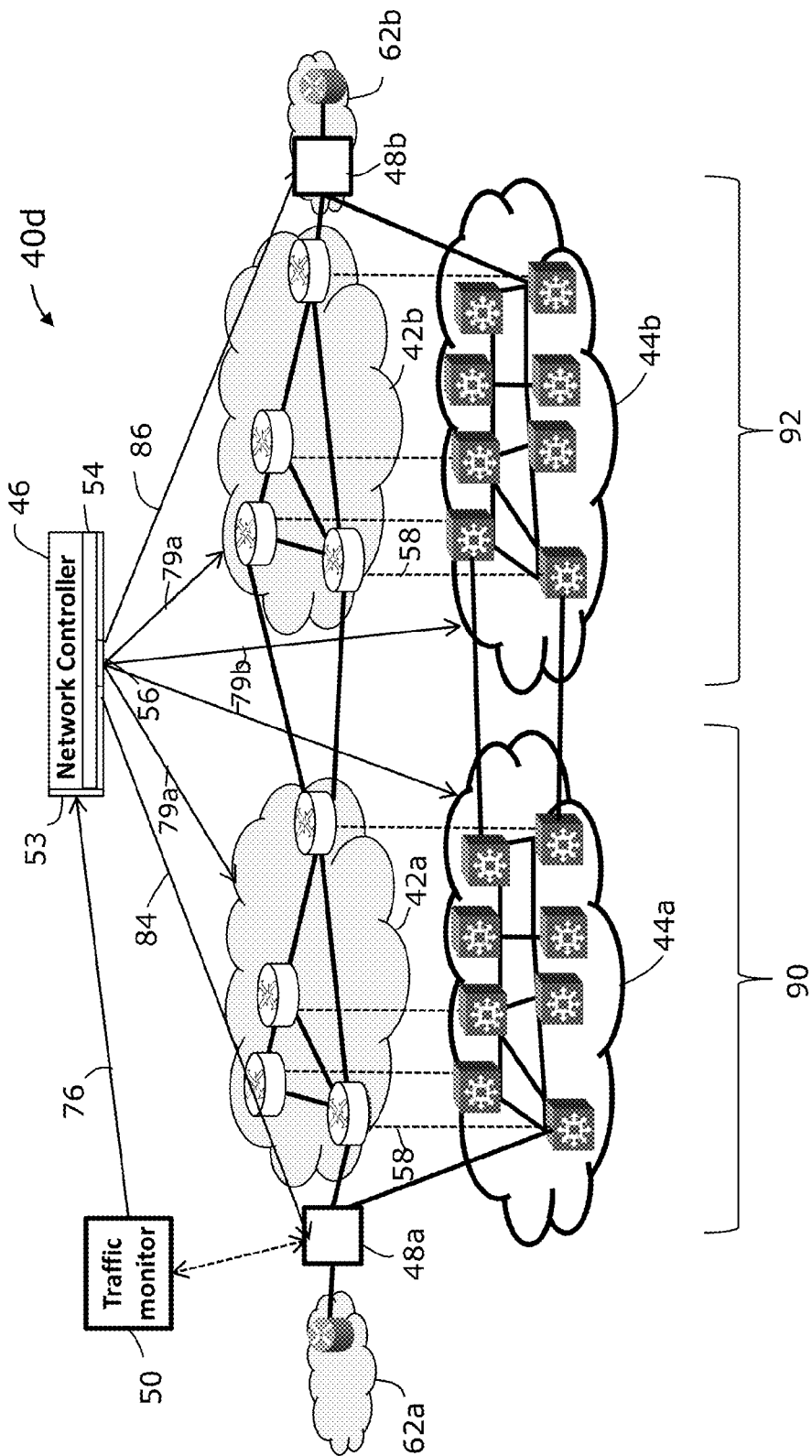
FIG. 7 is a schematic diagram of an exemplary information transport network with multiple sub-networks in accordance with the present disclosure.

In one embodiment, the information transport network system 40 may be comprised of multiple sub-networks. For example, FIG. 7 is a schematic diagram of an exemplary information transport network system 40*d* with multiple sub-networks in accordance with the present disclosure. In this example, the network system 40*d* contains a first sub-network 90 and a second sub-network 92. The network controller 46 may control the entire information transport network system 40*d*, or one or more elements of the information transport network system 40*d*, such as the switches 48 located on the edges of the information transport network system 40*d*. The network controller 46 may communicate with the network elements in the first and second sub-networks 90, 92 in implicit mode and/or explicit mode. For purposes of clarity, not all signals are shown. In one embodiment, the network controller 46 may control one or more sub-network controllers within the sub-networks 90, 92, as previously described.

CONCLUSION

Conventionally, information transport network resources may not be used in a cost-efficient manner, for example, using the packet switched backbone of the network for all service and traffic types. In accordance with the present disclosure, methods and systems are described in which one or more network controller may be used to configure one or more switch to provide a mechanism for switching traffic from a client network to a more optimal core network layer of the information transport network, based on characteristics of incoming data traffic and/or network information. The characteristics may be detected by a traffic monitor or as specified from an external source. The intelligence for assessing the incoming traffic and determining the best route through the multi-layer network may be done by the network controller, the network controller having an overall view of the network and available resources and relative costs associated with each resource. The network controller may be located outside the network. Based on the network controller analysis, the network controller may configure the switch to steer the client data traffic to the proper layer(s), as well as the path through the layer(s) to transport the data traffic to its destination.

In accordance with the present disclosure, messages transmitted between network participants can be processed by circuitry within input interface(s), and/or output interface(s) and/or control modules. Circuitry could be analog and/or digital, components, or one or more suitably programmed microprocessors and associated hardware and software, or hardwired logic. Also, certain portions of the implementations may be described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations. Additionally, it should be understood that the network elements/participants can be implemented in a variety of manners as is well known in the art.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Further, the described implementations may apply to a variety of networks, such as an optical network, an electronic network using copper cabling, a wireless network, or a combination of network types. In addition, information can be stored and processed in a distributed fashion, or in a centralized fashion.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

The following references are hereby incorporated herein by reference:
RFC 2328 "OSPF Version 2," Moy, J., The Internet Society, April 1998.
RFC3945 Mannie, E., "Generalized Multi-Protocol Label Switching (GMPLS) Architecture", RFC 3945, October 2004.
"OpenFlow Switch Specification," Version 1.3.2 (Wire Protocol 0x04), Apr. 25, 2013; Open Networking Foundation.
"Software-Defined Networking: The New Norm for Networks," White Paper, Apr. 13, 2012; Open Networking Foundation.
G.709-v3 ITU-T, "Interfaces for the Optical Transport Network (OTN)", G.709 Recommendation, December 2009.
G.805 ITU-T Recommendation, "Generic functional architecture of transport networks", March 2000.
G.872 ITU-T, "Architecture of optical transport networks", November 2001.
IEEE 802 Standards, standards dealing with local area networks and metropolitan area networks, IEEE 802 LAN/MAN Standards Committee.

What is claimed is:

1. A method comprising:
  receiving, with circuitry of a network controller, information indicative of characteristics of incoming data traffic in an information transport network, the information transport network comprising at least one packet switched layer and at least one transport layer;
  determining, with circuitry of the network controller, based on the characteristics of the incoming data traffic, to transport the incoming data traffic through at least one determined layer, the at least one determined layer being at least one of the packet switched layer and the transport layer;
  determining, with circuitry of the network controller, at least one route for the incoming data traffic through the at least one determined layer; and
  transmitting, with circuitry of the network controller, a signal containing computer executable instructions to at least one switch, upstream of the information transport network, to configure the switch to steer the incoming data traffic through the at least one route of the at least one determined layer,
    wherein the switch steers at least a first part of the incoming data to the at least one packet switched layer and steers at least a second part of the incoming data to the at least one transport layer.

2. A method comprising:
  receiving, with circuitry of a network controller, information indicative of characteristics of incoming data traffic in an information transport network, the information transport network comprising at least one packet switched layer and at least one transport layer;

determining, with circuitry of the network controller, based on the characteristics of the incoming data traffic, to transport the incoming data traffic through at least one determined layer, the at least one determined layer being at least one of the packet switched layer and the transport layer;

determining, with circuitry of the network controller, at least one route for the incoming data traffic through the at least one determined layer; and transmitting, with circuitry of the network controller, a signal containing computer executable instructions to at least one switch, upstream of the information transport network, to configure the switch to steer the incoming data traffic through the at least one route of the at least one determined layer, wherein the at least one switch is a first switch, the executable instructions are first executable instructions, and further comprising:

transmitting, with circuitry of the network controller, second computer executable instructions to at least one second switch, the at least one second switch downstream from the information transport network, to configure the at least one second switch to steer the data traffic to an external router.

3. The method of claim 2, wherein the network controller has access to network information; and wherein determining, with circuitry of the network controller, based on the characteristics of the incoming data traffic, to transport the incoming data traffic through the at least one determined layer, is further based on the network information.

4. The method of claim 3, wherein the network information is indicative of information comprising at least one of resources in the information transport network, availability of the resources, costs of the resources, power consumption, latency, network switching capability, and networking-related metrics.

5. The method of claim 2, further comprising:

transmitting, with circuitry of the network controller, a signal containing computer executable instructions to at least one network element within the information transport network, to configure the network element to steer the incoming data traffic through the at least one route of the at least one determined layer.

6. The method of claim 2, wherein the at least one route of the at least one determined layer comprises portions of both the packet switched layer and the transport layer.

7. The method of claim 2, wherein the switch steers the incoming data entirely to either the at least one packet switched layer or the at least one transport layer.

8. The method of claim 2, wherein the network controller comprises a combination of hardware and software.

9. A method comprising:

receiving, with circuitry of a network controller, information indicative of characteristics of incoming data traffic in an information transport network, the information transport network comprising at least one packet switched layer and at least one transport layer;

determining, with circuitry of the network controller, based on the characteristics of the incoming data traffic, to transport the incoming data traffic through at least one determined layer, the at least one determined layer being at least one of the packet switched layer and the transport layer;

determining, with circuitry of the network controller, at least one route for the incoming data traffic through the at least one determined layer; and transmitting, with circuitry of the network controller, a signal containing computer executable instructions to at least one switch, upstream of the information transport network, to configure the switch to steer the incoming data traffic through the at least one route of the at least one determined layer, wherein receiving, with circuitry of a network controller, information indicative of characteristics of incoming data traffic in an information transport network before the data traffic enters the information transport network, comprises receiving the information from a traffic monitor passively monitoring the data traffic before the data traffic enters the information transport network.

10. The method of claim 9, wherein the traffic monitor is part of the switch.

11. A network controller comprising:

an input interface for receiving a first signal containing information indicative of characteristics of incoming data traffic in an information transport network before the data traffic enters the information transport network;

a processor having a non-transient memory, the processor storing and executing first computer executable instructions to determine, based on the characteristics of the incoming data traffic, to transport the incoming data traffic through at least one determined layer within the information transport network, the at least one determined layer being at least one of a packet switched layer and a transport layer; and an output interface for transmitting a second signal to at least one switch, the second signal comprising second computer executable instructions to configure the switch to direct the incoming data traffic through the at least one determined layer, wherein the network controller determines to transport a first portion of the incoming data through the at least one packet switched layer and a second portion of the incoming data through the at least one transport layer.

12. The network controller of claim 11, wherein the processor storing and executing first computer executable instructions to determine, based on the characteristics of the incoming data traffic, to transport the incoming data traffic through at least one determined layer, further determines to transport the incoming data traffic through at least one determined layer based on network information.

13. The network controller of claim 11, wherein the processor storing and executing first computer executable instructions to determine to transport the incoming data traffic through at least one determined layer, further determines at least one route for the incoming data traffic through the at least one determined layer.

14. The network controller of claim 13, wherein the output interface transmits the second signal containing computer executable instructions to at least one network element within the information transport network, to configure the network element to steer the incoming data traffic through the at least one route of the at least one determined layer.

15. The network controller of claim 13, wherein the at least one route comprises routes through portions of both the packet switched layer and the transport layer.

16. The network controller of claim 13, wherein the at least one route is entirely through the at least one packet switched layer or through the at least one transport layer.

17. A network controller comprising:

an input interface for receiving a first signal containing information indicative of characteristics of incoming data traffic in an information transport network before the data traffic enters the information transport network;

a processor having a non-transient memory, the processor storing and executing first computer executable instructions to determine, based on the characteristics of the incoming data traffic, to transport the incoming data traffic through at least one determined layer within the information transport network, the at least one determined layer being at least one of a packet switched layer and a transport layer; and an output interface for transmitting a second signal to at least one switch, the second signal comprising second computer executable instructions to configure the switch to direct the incoming data traffic through the at least one determined layer, wherein receiving a first signal containing information indicative of characteristics of incoming data traffic in an information transport network before the data traffic enters the information transport network, comprises receiving the first signal from a traffic monitor passively monitoring the data traffic before the data traffic enters the information transport network.

18. The network controller of claim 17, wherein the traffic monitor is part of the at least one switch.

* * * * *